United States Patent
Du et al.

(10) Patent No.: US 9,815,192 B1
(45) Date of Patent: Nov. 14, 2017

(54) SERVO AND ROBOT WITH SERVO

(71) Applicant: UBTECH Robotics Corp., Shenzhen (CN)

(72) Inventors: Xuchao Du, Shenzhen (CN); Lefeng Liu, Shenzhen (CN); Hongyu Ding, Shenzhen (CN); Wenquan Shu, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/394,745

(22) Filed: Dec. 29, 2016

(30) Foreign Application Priority Data

Dec. 5, 2016 (CN) .......................... 2016 1 1101436

(51) Int. Cl.
| | |
|---|---|
| *F16H 57/08* | (2006.01) |
| *B25J 9/12* | (2006.01) |
| *F16H 1/20* | (2006.01) |
| *F16H 1/28* | (2006.01) |
| *F16H 37/04* | (2006.01) |

(52) U.S. Cl.
CPC .............. *B25J 9/126* (2013.01); *F16H 1/203* (2013.01); *F16H 1/28* (2013.01); *F16H 37/041* (2013.01)

(58) Field of Classification Search
CPC .......... F16H 37/041; F16H 1/28; F16H 1/203; B25J 9/126; B25J 9/102
See application file for complete search history.

(56) References Cited

U.S. PATENT DOCUMENTS

| | | | | |
|---|---|---|---|---|
| 8,162,789 | B2* | 4/2012 | Takeuchi | F16H 57/025 475/162 |
| 2005/0061097 | A1* | 3/2005 | Haga | F16H 1/203 74/423 |
| 2009/0017955 | A1* | 1/2009 | Takeuchi | F16H 57/025 475/162 |
| 2010/0273597 | A1* | 10/2010 | Wilson, Jr. | A62B 1/10 475/149 |
| 2012/0077637 | A1* | 3/2012 | Chen | B25J 17/0241 475/336 |
| 2015/0111691 | A1* | 4/2015 | Xu | F16H 1/28 475/331 |

* cited by examiner

*Primary Examiner* — David J Hlavka

(57) ABSTRACT

A servo and a robot with the servo are provided. The servo comprises a power input apparatus with a first output shaft, a deceleration apparatus, and a power output mechanism. The deceleration apparatus comprises a first-stage deceleration mechanism and a second-stage deceleration mechanism. The power output mechanism comprises a second output shaft and an output bearing fixedly installed on the second output shaft, wherein the second output shaft is an external spline output shaft. Through the external spline output shaft and the output bearing disposed on the power output mechanism, the servo could directly connect with an exterior component through the external spline output shaft, and the strength is improved. As a result, the friction between the servo and the exterior component is reduced, and the lifetime is therefore increased.

16 Claims, 6 Drawing Sheets

SERVO AND ROBOT WITH SERVO

CROSS REFERENCE TO RELATED APPLICATIONS

This application claims priority to Chinese Patent Application No. 201611101436.5, filed Dec. 5, 2016, which is hereby incorporated by reference herein as if set forth in its entirety.

BACKGROUND

1. Technical Field

The present disclosure generally relates to robots, and particularly to a servo and a robot with the servo.

2. Description of Related Art

A servo comprises a motor, a gear set driven to rotate by the motor, and a power output shaft for outputting power which is connected with the gear set, and a steering box connecting the power output shaft and an exterior connection part.

In the existed techniques, a plurality of internal splines are formed between the steering wheel and the power output shaft, which are for connecting an external connection component so as to rotate. However, the power output shaft is disposed inside the steering box, which is connected to an external component through the internal splines, and transmits power through steering box. As a result, the internal splines are often worn, hence the strength is reduced and is easy to be destroyed. In addition, it's not easy to be connected to an external gear so as to increase more deceleration effects. Furthermore, the original servo is without one more stage of bearing, which causes the instability of the output shaft or the steering box. Since it's liable to vibrate, the precision of the output angle is affected.

SUMMARY

The purpose of the present disclosure is providing a servo to resolve the technical problems including the weakness in the strength of existed servos and is liable to cause structural destruction which happens when outputting torque and instability.

A servo is provided. The servo comprises a power input apparatus providing rotational power, a deceleration apparatus driven to operate by the power input apparatus, and a power output mechanism driven to rotate by the deceleration apparatus. Wherein, the power input apparatus comprises a first output shaft; the deceleration apparatus comprises a first-stage deceleration mechanism partly installed on the first output shaft and used to change a power output direction, and a second-stage deceleration mechanism connected between the first-stage deceleration mechanism and the power output mechanism; the power output mechanism comprises a second output shaft driven to rotate by an output terminal of the second-stage deceleration mechanism and connected with an exterior component, and an output bearing fixedly installed on the second output shaft, wherein the second output shaft is an external spline output shaft.

Furthermore, the first-stage deceleration mechanism comprises a power gear installed on the first output shaft and rotating along with the first output shaft as well as a face gear engaged with the power gear, the rotation direction of the face gear is perpendicular to the rotation direction of the power gear.

Furthermore, the second-stage deceleration mechanism comprises a second-stage pinion rotating coaxially with the face gear, a middle gear set engaged with the second-stage pinion and driven to rotate by the second-stage pinion, a planetary gear set engaged with the middle gear set, a fixing gear engaged with the planetary gear set to prevent the planetary gear set from idling, wherein the second-stage pinion and the planetary gear set are locked on a fixing shaft on the power output mechanism.

Furthermore, the middle gear set comprises a first gear engaged with the second-stage pinion and driven to rotate by the second-stage pinion, a third-stage pinion rotating coaxially along with the first gear, a second gear engaged with the third-stage pinion and driven to rotate by the third-stage pinion, a sun gear rotating coaxially along with the second gear and driving the planetary gear set to rotate.

Furthermore, the planetary gear set comprises three planetary gears disposed around the outside of the sun gear and engaged with the sun gear, a planet carrier installed on the fixing shaft for installing the planetary gears, the fixing gear is put around the periphery of the planetary gears and engaged with each of the planetary gears.

Furthermore, the power output mechanism further comprises an end cap fixedly connected to the second output shaft and the planet carrier, the end cap is located between the second output shaft and the planet carrier, the planet carrier comprises a lower clamp board fixedly connected with the end cap and a planetary shaft fixedly connected with each of the planetary gears, an installation opening for installing each of the planetary gears is formed between the end cap and the lower clamp board, the planetary shaft is disposed inside the installation opening, and one end of the planetary shaft is inserted into the end cap while the other end of the planetary shaft is inserted into the lower clamp board.

Furthermore, the servo further comprises a base seat provided with a first accommodation chamber, and a side cover fixedly connected with the base seat and forming a second accommodation chamber along with the base seat, the power input apparatus is installed inside the first accommodation chamber, the first-stage deceleration and the second-stage deceleration mechanism are installed inside the second accommodation chamber, the fixing gear is fixed on the base seat and the side cover.

Furthermore, the base seat comprises a body part provided with the first accommodation chamber, a support part protruding out of the bottom of the body part for supporting the face gear, the support part is provided with a fixing aperture, the fixing shaft is inserted into the fixing aperture and passes through the face gear.

Furthermore, the base seat further comprises ring part opposite to the support part and disposed around the periphery of the fixing gear, and a fixed inner side located between the ring part and the support part and opposite to an end face of the side cover so as to fixedly connect to the end face of the side cover.

The present disclosure further provides a robot with the servo.

In comparison with existed techniques, the servo of the present disclosure performs power transmission through the first-stage deceleration mechanism and the second-stage deceleration mechanism, which has a compact structure and a larger single stage transmission ratio. In addition, through the external spline output shaft and the output bearing disposed on the power output mechanism, the servo could directly connect with an exterior component through the external spline output shaft, and the strength is improved. As a result, the friction between the servo and the exterior component is reduced, and the lifetime is therefore increased. The external spline output shaft is used as the second output shaft, which facilitates the connection to a gear of the exterior component so as to increase more deceleration effects. The power output mechanism of the servo is fixed by adding one stage of bearing to the exterior of the servo through disposing the output bearing on the power output mechanism. The bearing could be used alone with an internal spline or an external spline, thereby strengthen the structure of the servo so as to increase the precision of the angle outputted by the power output mechanism.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
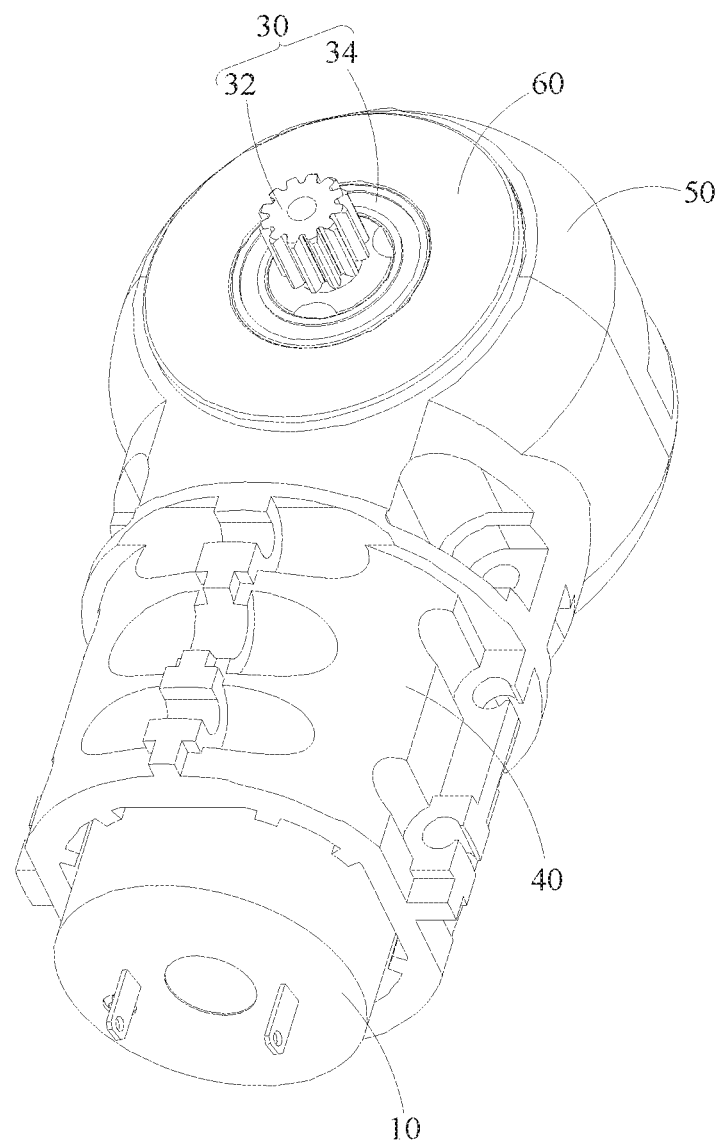
FIG. 1 is a structure diagram of a servo according to one embodiment.
Figure 2:
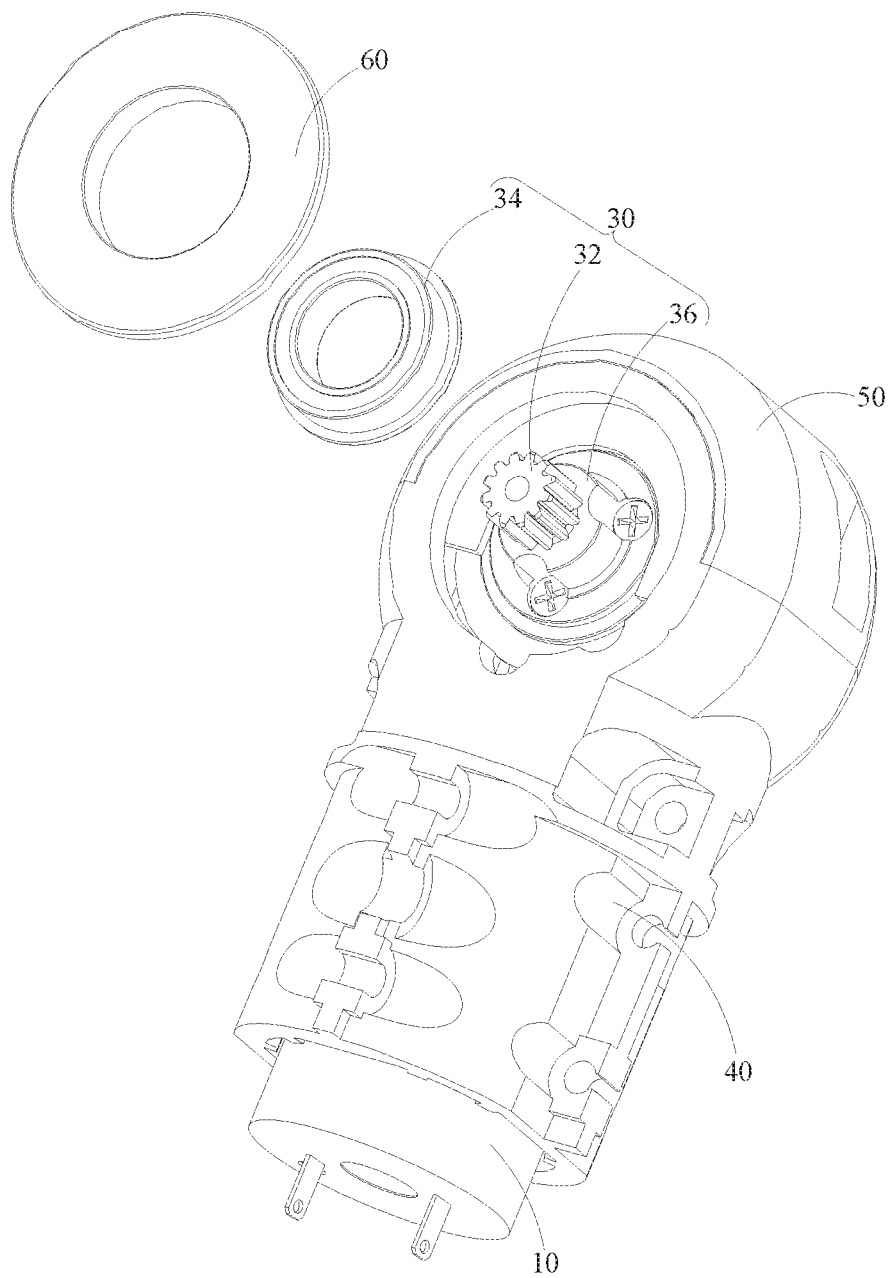
FIG. 2 is an exploded view of one aspect of the servo of FIG. 1.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

In the descriptions of the present disclosure, what need to be comprehended is that, the direct or location relationships indicated by the terms "length", "width", "upper", "lower", "front", "back", "left", "right", "vertical", "horizontal", "top", "bottom", "interior", "exterior" and the like are based on the orientation or positional relation shown in the drawings, which are merely for the convenience to describe the present disclosure and for simplifying the descriptions, rather than indicating or implying the descripted apparatus or component need to have a particular orientation and constructed/operated in the particular orientation, and therefore can't be comprehended as the limitations to this disclosure.

In addition, the terms "the first" and "the second" and the like are merely for the convenience of description, and can't be comprehended as indicating/implying the relative importance or indicating/implying the amount of the descripted technical characteristic. Therefore, the characteristics limited by "the first" and "the second" could include one or more of the characteristics expressly or implicitly. In the descriptions of the present disclosure, the meaning of "multiple" is two or more, unless otherwise specifically limited.

In the present disclosure, unless otherwise specifically limited, the terms "install", "connect with each other", "connect", and "fix" and the like should be comprehended broadly, for example, could be comprehended as fixed connected, removable connected, or be monolithic; could be mechanically connect or electrically connect; could be directly connect or indirectly connect through a middle media; and could be the connection in the interior of two components or the interaction between two components. A general technician of this technical field could comprehend the specific meaning of the above-mentioned terms according to specific situations.

For the convenience of clarifying the purpose, the technical proposal, and the advantage of the present disclosure, the present disclosure will be described in more details with reference to the accompanying drawings and embodiments.

Referring to FIG. 1 to FIG. 6, the servo in an embodiment of this disclosure comprises a power input apparatus 10, a deceleration apparatus 20, and a power output mechanism 30. The power input apparatus 10 provides rotational power, and comprises a first output shaft 12. The deceleration apparatus 20 is driven to operate by the power input apparatus 10. The power output mechanism 30 is driven to rotate by the deceleration apparatus 20. The deceleration apparatus 20 comprises a first-stage deceleration mechanism 22 and a second-stage deceleration mechanism 24. The first-stage deceleration mechanism 22 is partly installed on the first output shaft 12, which is used to change the direction of outputting power. The second-stage deceleration mechanism 24 is connected between the first-stage deceleration mechanism 22 and the power output mechanism 30. The power output mechanism 30 comprises a second output shaft 32 and an output bearing 34. The second output shaft 32 is driven to rotate by an output terminal of the second-stage deceleration mechanism 24, which is connected with an exterior component (not shown). The output bearing 34 is fixedly installed on the second output shaft 32, wherein the second output shaft 32 is an external spline output shaft.

The servo of the present disclosure performs power transmission through the first-stage deceleration mechanism 22 and the second-stage deceleration mechanism 24, which has a compact structure and a larger single stage transmission ratio. In addition, through the external spline output shaft and the output bearing 34 disposed on the power output mechanism 30, the servo could directly connect with the exterior component through the external spline output shaft, and the strength is improved. As a result, the friction between the servo and the exterior component is reduced, and the lifetime is therefore increased. The external spline output shaft is used as the second output shaft 32, which facilitates the connection with a gear of the exterior component so as to increase more deceleration effects. The servo adds one stage of bearing to the exterior of the servo through disposing the output bearing 34 on the power output mechanism 30, thereby fixing the power output mechanism 30. The bearing could be used alone with an internal spline or an external spline, thereby strengthen the structure of the servo so as to increase the precision of the angle outputted by the power output mechanism 30.

In this embodiment, an external spline output shaft is used as the second output shaft 32, so as to directly connect with the exterior component. As a result, the strength of connection is improved, the friction between the servo and the exterior component is reduced, and the lifetime is therefore increased.

In this embodiment, the power input apparatus 10 is a drive motor, while various types of drive motor could be chosen based on the actual needs of the output power.

Figure 3:
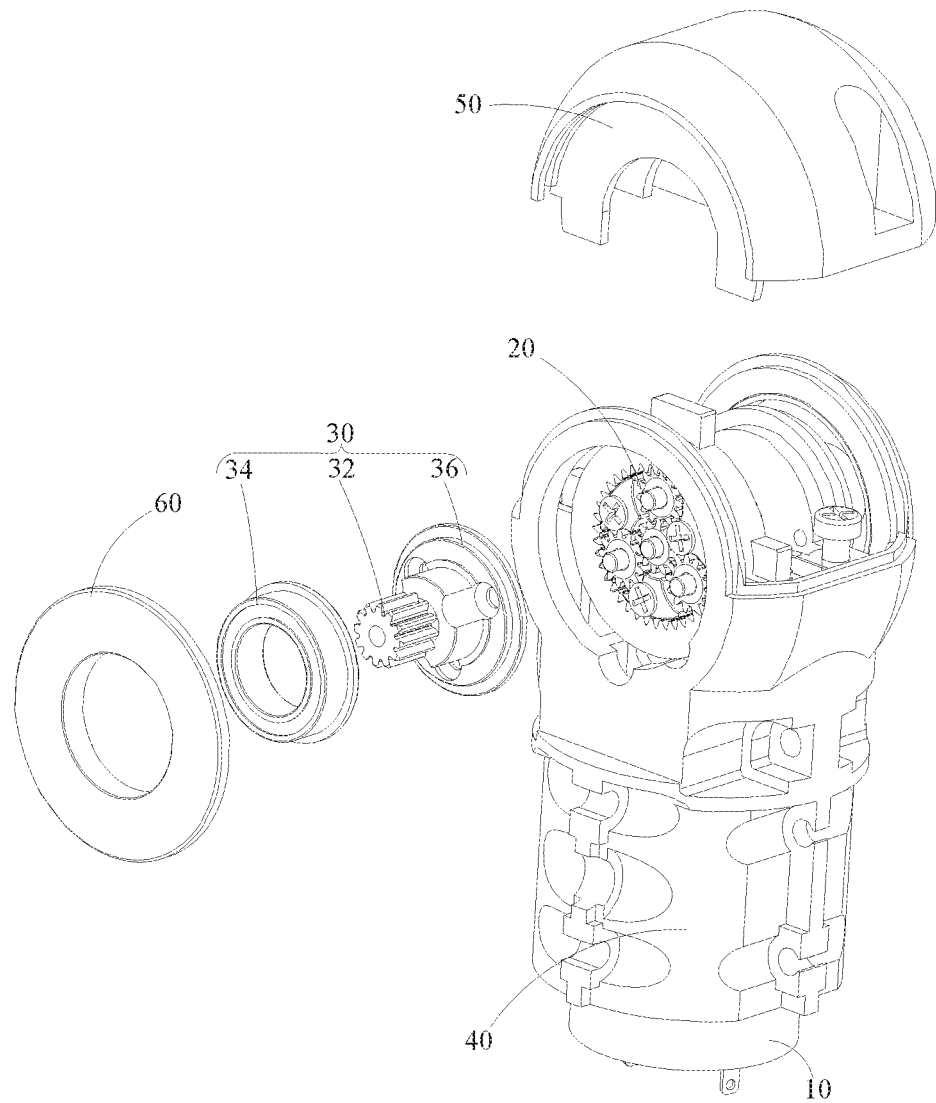
FIG. 3 is an exploded view of another aspect of the servo of FIG. 1.
Figure 4:
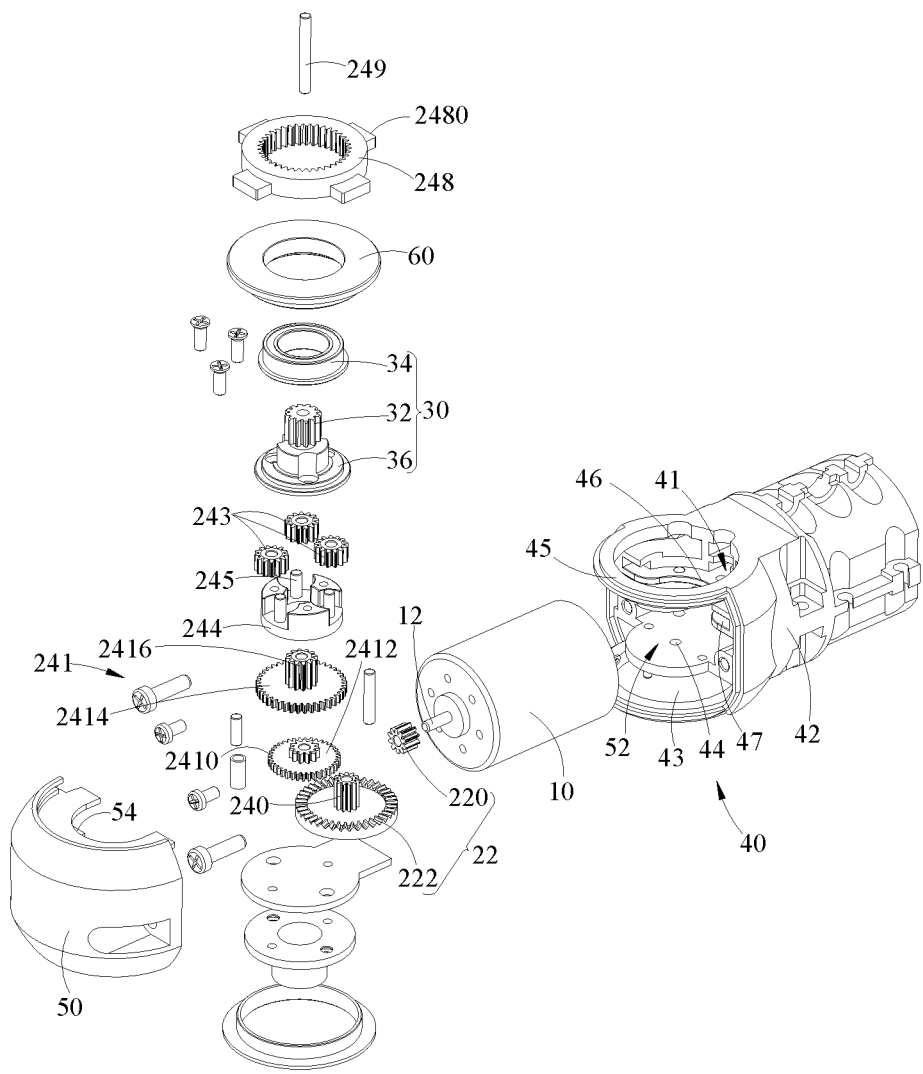
FIG. 4 is an exploded view of the servo of FIG. 3.
Figure 5:
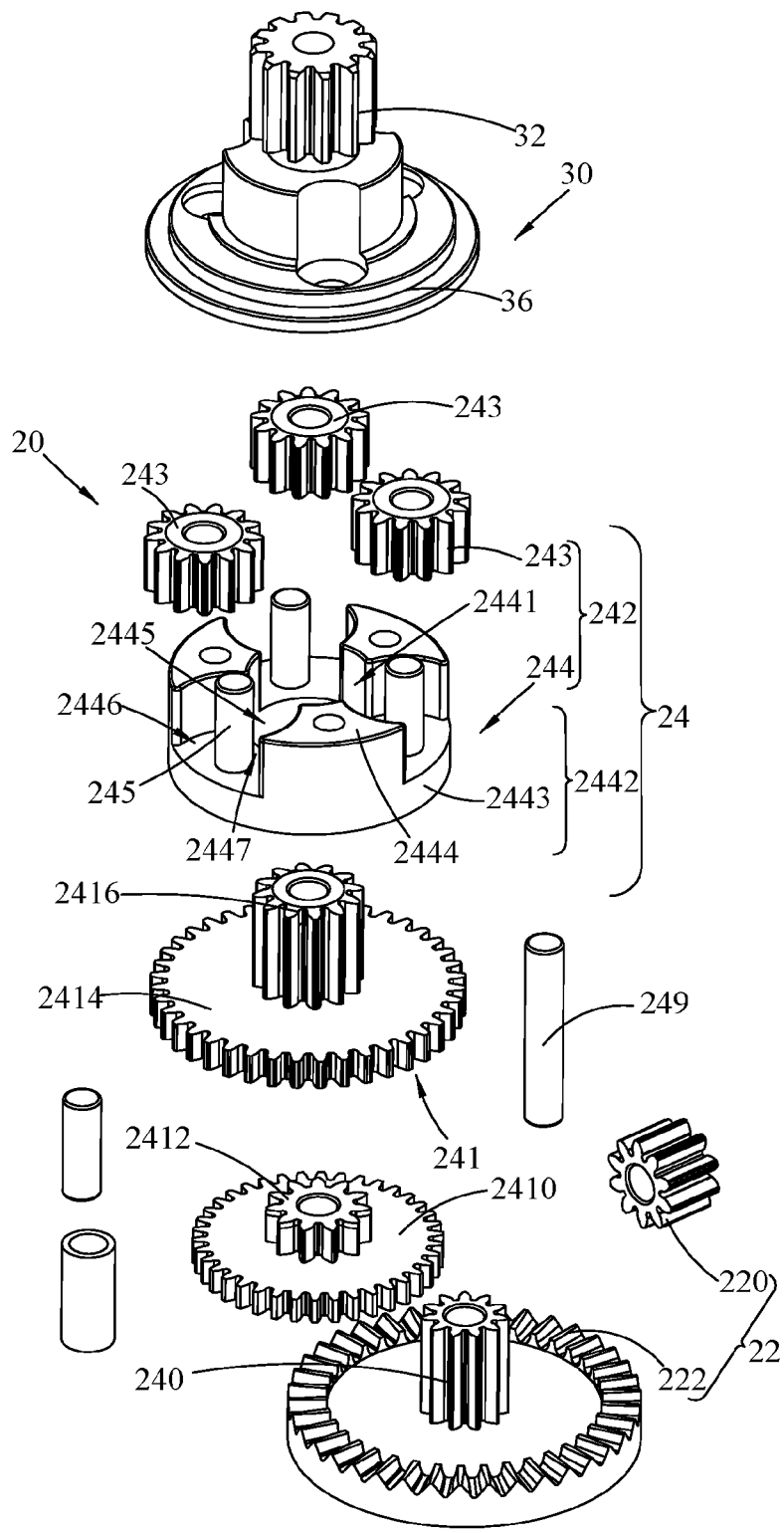
FIG. 5 is an exploded view of the deceleration apparatus of FIG. 4.

Referring to FIG. 3 to FIG. 5, furthermore, the first-stage deceleration mechanism 22 comprises a power gear 220 and a face gear 222. The power gear 220 is installed on the first output shaft 12 and rotates along with the first output shaft 12. The face gear 222 is engaged with the power gear 220. The rotation direction of the face gear 222 is perpendicular to that of the power gear 220. The teeth of the face gear 222 are distributed along the circumferential direction of the face gear 222 and face the second-stage deceleration mechanism 24. The teeth of the power gear 220 are disposed on the surface of the outer circumference and disputed along the axial direction. The axial direction of the power gear 220 is perpendicular to that of the face gear 222, so that the direction of the power outputted by the first output shaft 12 could be changed. The face gear 222 comprises a disk surface part with a first through hole. The teeth of the face gear 222 are distributed along the circumferential direction of an upper surface of the disk surface part. Preferably, the teeth of the face gear 222 are distributed along a ring with a same radius with the disk surface part.

In this embodiment, the amount of the teeth of the face gear 22 is larger than that of the power gear 220, thereby achieving speed changing effect in a certain extent.

Referring to FIG. 4 and FIG. 5, furthermore, the second-stage deceleration mechanism 24 comprises a second-stage pinion 240, a middle gear set 241, a planetary gear set 242, and a fixing gear 248. The second-stage pinion 240 rotates as driven by the first-stage deceleration mechanism 22. Specifically, the second-stage pinion 240 rotates coaxially with the face gear 222. The middle gear set 241 is engaged with the second-stage pinion 240 and driven to rotate by the second-stage pinion 240. The planetary gear set 242 is engaged with the middle gear set 241. The fixing gear 248 is engaged with the planetary gear set 242 to limit the idling of the planetary gear set 242. The second-stage pinion 240 and the planetary gear set 242 each are locked to a fixing shaft 249 on the power output mechanism 30. The servo achieves a sufficient deceleration effect through the second-stage deceleration mechanism 24 provided with the middle gear set 241 and the planetary gear set 242, and prevents the planetary gear set 242 from idling through disposing the fixing gear 248, thereby ensuring the planetary gear set 242 to operate normally.

In this embodiment, the second-stage pinion 240 protrudes out of the upper surface of the disk surface part, which is provided with outer teeth engaged with the middle gear. The second-stage pinion 240 protrudes out of the disk surface part, which is provided with a second through hole (not shown) communicating with the first through hole. The outer teeth of the second-stage pinion 240 is engaged with the middle gear set 241, so as to drive the middle gear set 241 to rotate. Preferably, the outer teeth of the second-stage pinion 240 distributes along the axial direction of the outer surface of the second-stage pinion 240.

In this embodiment, the second-stage pinion 240 and the face gear 222 are monolithic. The second-stage pinion 240 rotates along with the rotation of the face gear 222, and has a same rotation speed with the face gear 222, thereby driving the middle gear set 241 to rotate.

Referring to FIG. 4 and FIG. 5, furthermore, the middle gear set 241 comprises a first gear 2410, a third-stage pinion 2412, a second gear 2414, and a sun gear 2416. The first gear 2410 is engaged with the second-stage pinion 240 and driven to rotate by the second-stage pinion 240. The third-stage pinion 2412 rotates coaxially along with the first gear 2410. The second gear 2414 is engaged with the third-stage pinion 2412 and driven to rotate by the third-stage pinion 2412. The sun gear 2416 rotates coaxially along with the second gear 2414 and drives the planetary gear set 242 to rotate. The servo achieves a larger speed changing through disposing the first gear 2410 and the second gear 2414. The rotation axis of the second-stage pinion 240, the first gear 2410, the third-stage pinion 2412, the second gear 2414, and the sun gear 2416 are disposed in parallel. The rotation axes of the first gear 2410 and the third-stage pinion 2412 are collinear, while the rotation axes of the second gear 2414 and the sun gear 2416 are collinear.

In this embodiment, the third-stage pinion 2412 and the first gear 2410 are monolithic, and the third-stage pinion 2412 rotates along with the rotation of the first gear 2410. The sun gear 2416 and the second gear 2414 are monolithic, and the sun gear 2416 rotates along with the rotation of the second gear 2414.

In this embodiment, the sun gear 2416 engages the planetary gear set 242 and drives the planetary gear set 242 to rotate.

It could be comprehended that the second-stage deceleration mechanism 24 of the servo could be provided with merely the first gear 2410 and the third-stage pinion 2412, such that the first gear 2410 engages the second-stage pinion 240 while the third-stage pinion 2412 engages the planetary gear set 242, thereby achieving deceleration effect in a certain extent.

The second-stage deceleration mechanism 24 of the servo could also be provided with merely the second gear 2414 and the sun gear 2416, such that the second gear 2414 engages the second-stage pinion 240 while the sun gear 2416 engages the planetary gears, thereby achieving deceleration effect in a certain extent.

In addition, the second-stage deceleration mechanism 24 of the servo could further be provided with the first gear 2410, the third-stage pinion 2412, the second gear 2414, and the sun gear 2416 simultaneously, and even could be provided with multiple first gears 2410 and multiple third-stage pinions 2412 which are match with each other and/or multiple second gears 2414 and multiple sun gears 2416 which are match with each other, the design could be arbitrarily changed to achieve required deceleration effect.

Figure 6:
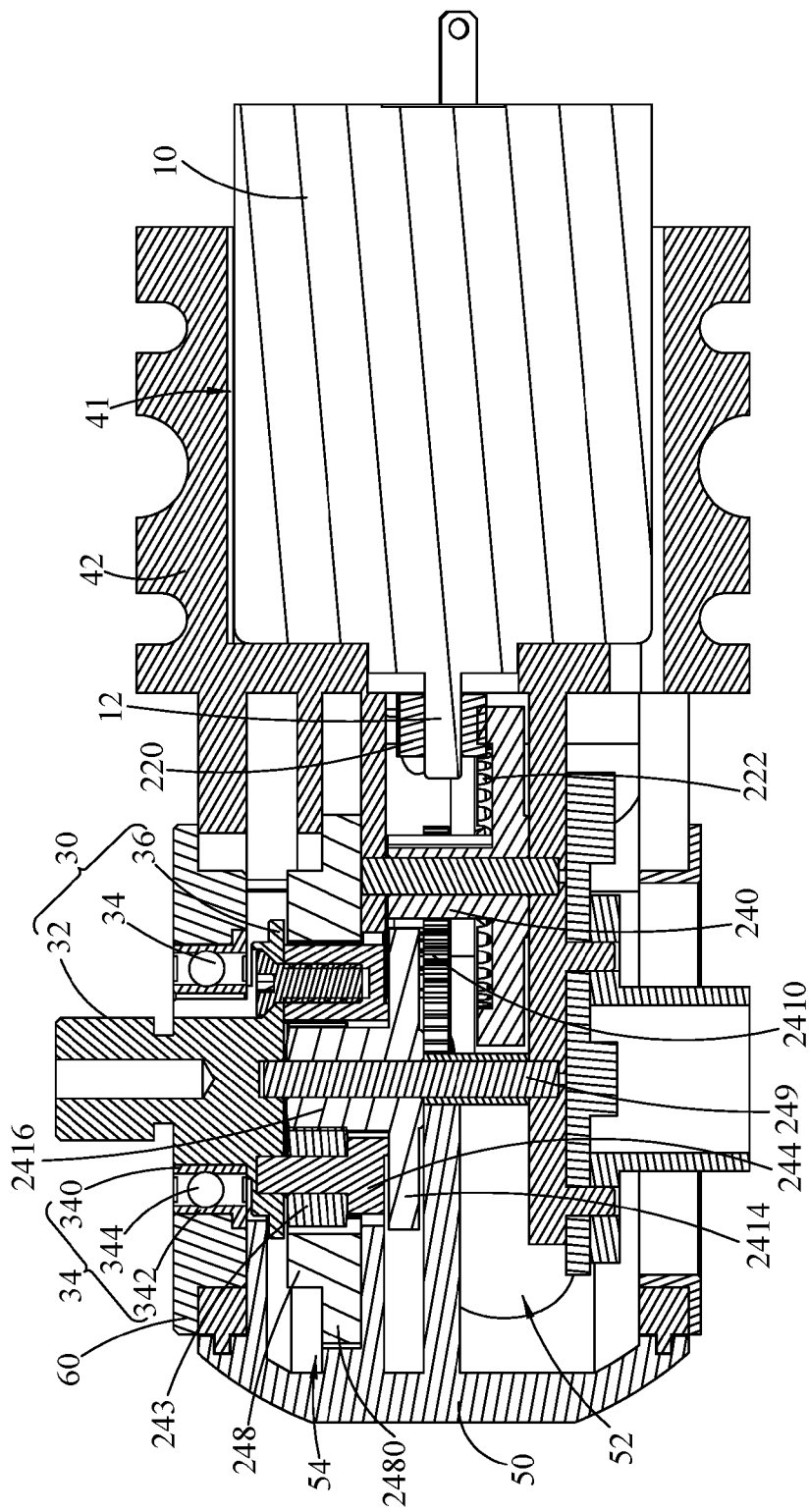
FIG. 6 is a sectional view of the servo of FIG. 3.

Referring to FIG. 4 to FIG. 6, furthermore, the planetary gear set 242 comprises three planetary gears 243 and a planet carrier 244. The planetary gears 243 are disposed around the outside of the sun gear 2416 and engaged with the sun gear 2416. The planet carrier 244 is used to install the planetary gears 243, which is installed on the fixing shaft 249. The fixing gear 248 is put around the periphery of the planetary gears 243 and is engaged with each of the planetary gears 243. Each of the planetary gears 243 is engaged with the sun gear 2416 and drives the planet carrier 244 to rotate, thereby driving the power output mechanism 30 to rotate. It could be comprehended that the planet carrier 244 is provided with a through hole 2445 and closes to form an accommodation chamber 2441. The sun gear 2416 is accommodated within the accommodation chamber 2441. Outer teeth of the sun gear 2416 are engaged with outer teeth of each of the planetary gears 243, so as to drive each of the planetary gears 243 to rotate. The planetary gears 243 in turn drive the planet carrier 244 to rotate, and drive the power output mechanism 30 to rotate along with the planet carrier 244.

Through the three planetary gears 243 disposed in the planetary gear set 242, the servo uses the three planetary gears 243 to transmit loads simultaneously, so as to divide the power, and the carrying capacity of the deceleration apparatus 20 is therefore enhanced.

In this embodiment, since the servo is provided with the second-stage deceleration mechanism 24 driven by the planetary gears 243, which has a larger single stage deceleration ratio. As a result, the requirement of total deceleration ratio of the servo can be satisfied by merely the first-stage deceleration mechanism 22 and the second-stage deceleration mechanism 24. In addition, since the planetary gear 243 is adopted in the servo, the amount of gears used in the servo is largely reduced, so that the steps to assemble the servo are relatively reduced, and the cost is saved. At the same time, since the planetary gears 243 are used to perform transmission, the second-stage deceleration mechanism 24 has a very compact structure and high carrying capacity.

In this embodiment, the fixing gear 248 is provided with inner gear teeth engaging with each of the planetary gears 243. It could be comprehended that the inner gear teeth of the fixed gear 248 are engaged with the outer teeth of the planetary gear 243 to prevent each of the planetary gears 243 from idling, thereby ensuring normal operation of each of the planetary gears 243.

Referring to FIG. 4 to FIG. 6, furthermore, the power output mechanism 30 further comprises an end cap 36. The end cap 36 is fixedly connected to the second output shaft 32 and the planet carrier 244. The end cap 36 is located between the second output shaft 32 and the planet carrier 44. The planet carrier 244 comprises a lower clamp board 2442 fixedly connected with the end cap 36 and a planetary shalt 245 fixedly connected with each of the planetary gears 243. An installation opening 2447 for installing each of the planetary gears 243 is formed between the end cap 36 and the lower clamp board 2442. The planetary shaft 245 is disposed inside the installation opening 2447, and one end of the planetary shaft 245 is inserted into the end cap 36 while the other end of the planetary shaft 245 is inserted into the lower clamp board 2442. The servo realizes the installation of each of the planetary gears 243 through disposing the end cap 36 and the lower clamp board 2442, which has a compact structure and easy to be assembled/disassembled.

In this embodiment, the end cap 36 and the external spline output shaft are monolithic. In the servo, the end cap 36 and the lower clamp board 2442 are utilized to install each of the planetary gears 243, and the planetary shaft 245 is disposed between the end cap 36 and the lower clamp board 2442 so as to fixedly install each of the planetary gears 243 on the planet shaft 245.

While installing, each of the planetary shafts 245 is inserted into the corresponding planetary gear 243 and fixedly engaged with the planetary gear 243, one end of the planet shaft 245 is inserted into the lower clamp board 2442, the end cap 36 is disposed opposite to the lower clamp board 2442, and the other end of the planet shaft 245 is inserted into the end cap 36. The cap 36 and the lower clamp board 2442 are fixed together by a lock screw, so as to install the planetary shaft 245 in the installation opening 2447 along with the planetary gear 243. Through the engagement of the sun gear 2416, the planetary gear 243 drives the end cap 36 and the lower clamp board 2442 which are fixed with each other to rotate.

Referring to FIG. 4 to FIG. 6, in this embodiment, the lower clamp board 2442 comprises a seat body 2443 and a plurality of protrusion posts 2444. The protrusion posts 2444 protrude out of the surface of the seat body 2443 toward the end cap 36. The protrusion posts 2444 are spaced apart, while one planetary gear 243 is installed between the adjacent two protrusion posts 2444. The seat body 2443 is provided with a through hole 2445 for the sun gear 2416 to pass through and a first installation slot 2446 between adjacent two of the protrusion posts 2444. One end of the planet shaft 245 is inserted into the first installation slot 2446. The cap 36 is provided with a second installation slot (not shown) opposite to the first installation slot 2446, and the other end of the planetary shaft 245 is inserted into the second installation slot. The end cap 36 is disposed opposite the lower clamp board 2442 such that the first installation slot 2446 faces the second installation slot, and a lock screw passing through the end cap 36 is secured to the protrusion posts 2444 of the lower clamp board 2442, such that adjacent two of the protrusion posts 2444 and the end cap 36 close to form the installation opening 2447 for installing the planetary gear 243. The seat body 2443, the protrusion posts 2444, and the end cap 36 close to form the accommodation chamber 2441 for accommodating the sun gear 2416. The accommodation chamber 2441 is in communication with the installation opening 2447. The sun gear 2416 is accommodated inside the accommodation chamber 2441 and engaged with each of the planetary gears 243 installed inside the installation opening 2447, so that the planetary gear 243 drives the end cap 36 and the lower clamp board 2442 to rotate, thereby driving the external spline output shaft to rotate and transmit power.

In this embodiment, both ends of each of the planetary shafts 245 are respectively installed inside the first installation slot 2446 and the second installation slot through bearings, so that each of the planetary gears 243 drives the end cap 36 and the lower clamp board 2442 to rotate.

In this embodiment, each of the planetary gears 243 is disposed along the circumferential direction of the fixed shaft 249 such that the distances between two adjacent planetary gears 243 are the same. Through disposing the planetary gears 243 equidistantly, the servo could transmit the loads evenly and simultaneously, so that the power divided evenly.

Referring to FIG. 4 to FIG. 6, furthermore, the servo further comprises a base seat 40 and a side cover 50. The base seat 40 is provided with a first accommodation chamber 41. The side cover 50 is fixedly connected with the base seat 40 and forming the second accommodation chamber 52 along with the base seat 40. The power input apparatus 10 is installed inside the first accommodation chamber 41, the first-stage deceleration 22 and the second-stage deceleration mechanism 24 are installed inside the second accommodation chamber 52, and the fixing gear 248 is fixed on the base seat 40 and the side cover 50. The base seat 40 and the side cover 50 form an appearance part of the servo, which constitute a housing structure of the servo, so as to protect the power input device 10, the first-stage deceleration mechanism 22, and the second-stage deceleration mechanism 24. The periphery of the fixed gear 248 is fixed on the base seat 40 and the side cover 50, and is accommodated inside the second accommodation chamber 52.

Referring to FIG. 4 to FIG. 6, furthermore, the base seat 40 comprises a body part 42 and a support part 43. The body part 42 is provided with the first accommodation chamber 41. The support part 43 protrudes out of the bottom of the body part 42, which is utilized to support the face gear 222.

The support part 43 is provided with a fixing aperture 44, and the fixing shaft 249 is inserted into the fixing aperture 44 and passes through the face gear 222. It could be comprehended that the fixing aperture 44, the through hole 2445, and the first through hole of the face gear 222 communicate with each other. The fixing shaft 249 passes through the fixing aperture 44, the through hole 2445, the first through hole of the face gear 222, the second through hole of the second-stage pinion 240 in turn, and is inserted into the end cap 36 of the power output mechanism 30.

Referring to FIG. 4 to FIG. 6, furthermore, the base seat 40 further comprises a ring part 45 and a fixed inner side 46. The ring part 45 is opposite to the support part 43 and disposed around the periphery of the fixing gear 248. The fixed inner side 46 is located between the ring part 45 and the support part 43 and opposite to an end face of the side cover 50 so as to fixedly connect to the end face of the side cover 50. The ring portion 45 is disposed opposite to the support part 43, and is engaged with the side cover 50. The fixed inner side 46 is a portion protruding from the first output shaft 12 of the power input apparatus 10, and the fixed inner side 46 is provided with a communication hole that communicates with the first accommodating chamber 41 and the second accommodating chamber 52. The first output shaft 12 and the power gear 220 installed on the first output shaft 12 pass through the communication hole along the first accommodating chamber 41, and match the face gear 222 in the second accommodating chamber 52.

In this embodiment, the body part 42, the support part 43, and the ring part 45 are monolithic.

In this embodiment, the periphery of the fixed gear 248 is fixed on the end face of the side cover 50 and the fixed inner side 46.

Referring to FIG. 4 to FIG. 6, in this embodiment, the fixed inner side 46 is provided with a first fixing slot 47 for fixing the fixed gear 248 through engagement, and the side cover 50 is provided with a second fixing slot 54 opposite to the first fixing slot 47. The outer periphery of the fixed gear 248 is provided with a plurality of fixing blocks 2480 protruding therefrom. Each of the fixing blocks 2480 is engaged into the first fixing slot 47 and the second fixing slot 54 to achieve a fixed connection. The side cover 50 is provided with a first position fixing slot and a second position fixing slot (not shown) for engaging the body part 42 and the ring part 45 at the inward of the side cover 50, wherein the first position fixing slot and the second position fixing slot are located on two sides of the second fixing slot 54. Preferably, the amount of the fixing blocks 2480 is four, while the fixing blocks 2480 are disposed along the periphery of the fixed gear 248 with a same distance between two adjacent fixing blocks 2480.

In this embodiment, the servo further comprises a position fixing ring 60 which is disposed around the periphery of the output bearing 34 and embedded in the inner side of the ring part 45, so that the output bearing 34 is stably installed in the base seat 40 to avoid the radial deviation.

Referring to FIG. 6, in each of the above-mentioned embodiments, the output bearing 34 comprises an inner circle 340, an outer circle 342, and a rolling body 344. The inner circle 340 is put around the second output shaft 32. The outer circle 342 is coaxial with and spaced from the inner circle 340. The rolling body 344 is disposed between the inner circle 340 and the outer circle 342. The outer circle 342 is engaged in the position fixing ring 60, which utilizes the position fixing ring 60 to fix between the outer circle 342 and the body part 42 of the base seat 40, so as to fix the output bearing 34 in the base seat 40, thereby reducing rotational friction between the second output shaft 32 and the position fixing ring 60.

Referring to FIG. 1 to FIG. 6, an embodiment of a robot of the present disclosure comprises the above-mentioned servo. The servo in this embodiment has a same structure as that of the servo of the above-mentioned embodiments and has the same function, and will not be described here.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo, comprising:
a power input apparatus providing rotational power;
a deceleration apparatus driven to operate by the power input apparatus; and
a power output mechanism driven to rotate by the deceleration apparatus;
wherein the power input apparatus comprises a first output shaft; the deceleration apparatus comprises a first-stage deceleration mechanism partly installed on the first output shaft and used to change a power output direction, and a second-stage deceleration mechanism connected between the first-stage deceleration mechanism and the power output mechanism; the power output mechanism comprises a second output shaft driven to rotate by an output terminal of the second-stage deceleration mechanism and connected with an exterior component, and an output bearing fixedly installed on the second output shaft, wherein the second output shaft is an external spline output shaft;
the first-stage deceleration mechanism comprises a power gear installed on the first output shaft and rotating along with the first output shaft as well as a face gear engaged with the power gear, the rotation direction of the face gear is perpendicular to the rotation direction of the power gear; and
the second-stage deceleration mechanism comprises a second-stage pinion rotating coaxially with the face gear, a middle gear set engaged with the second-stage pinion and driven to rotate by the second-stage pinion, a planetary gear set engaged with the middle gear set, a fixing gear engaged with the planetary gear set to prevent the planetary gear set from idling, the second-stage pinion and the planetary gear set each are locked on a fixing shaft on the power output mechanism.

2. The servo of claim 1, wherein the middle gear set comprises a first gear engaged with the second-stage pinion and driven to rotate by the second-stage pinion, a third-stage pinion rotating coaxially along with the first gear, a second gear engaged with the third-stage pinion and driven to rotate by the third-stage pinion, a third sun gear rotating coaxially along with the second gear and driving the planetary gear set to rotate.

3. The servo of claim 1, wherein the planetary gear set comprises three planetary gears disposed around the outside of the third sun gear and engaged with the third sun gear, a planet carrier installed on the fixing shaft corresponding to the planetary gear set for installing the planetary gears, the fixing gear is put around a periphery of the planetary gears and engaged with each of the planetary gears.

4. The servo of claim 3, wherein the power output mechanism further comprises an end cap fixedly connected to the second output shaft and the planet carrier, the end cap is located between the second output shaft and the planet carrier, the planet carrier comprises a lower clamp board fixedly connected with the end cap and a planetary shaft fixedly connected with each of the planetary gears, an installation opening for installing each of the planetary gears is formed between the end cap and the lower clamp board, the planetary shaft is disposed inside the installation opening, and one end of the planetary shaft is inserted into the end cap while the other end of the planetary shaft is inserted into the lower clamp board.

5. The servo of claim 1, further comprising a base seat provided with a first accommodation chamber, and a side cover fixedly connected with the base seat and forming a second accommodation chamber along with the base seat, the power input apparatus is installed inside the first accommodation chamber, the first-stage deceleration and the second-stage deceleration mechanism are installed inside the second accommodation chamber, the fixing gear is fixed on the base seat and the side cover.

6. The servo of claim 5, wherein the base seat comprises a body part provided with the first accommodation chamber, a support part protruding out of the bottom of the body part for supporting the face gear, the support part is provided with a fixing aperture, the fixing shaft corresponding to the second-stage pinion is inserted into the fixing aperture and passes through the face gear.

7. The servo of claim 6, wherein the base seat further comprises ring part opposite to the support part and disposed around a periphery of the fixing gear, and a fixed inner side located between the ring part and the support part and opposite to an end face of the side cover so as to fixedly connect to the end face of the side cover.

8. A robot comprising a servo, the servo comprising:
a power input apparatus providing rotational power;
a deceleration apparatus driven to operate by the power input apparatus; and
a power output mechanism driven to rotate by the deceleration apparatus;
wherein the power input apparatus comprises a first output shaft; the deceleration apparatus comprises a first-stage deceleration mechanism partly installed on the first output shaft and used to change a power output direction, and a second-stage deceleration mechanism connected between the first-stage deceleration mechanism and the power output mechanism; the power output mechanism comprises a second output shaft driven to rotate by an output terminal of the second-stage deceleration mechanism and connected with an exterior component, and an output bearing fixedly installed on the second output shaft, wherein the second output shaft is an external spline output shaft;
the first-stage deceleration mechanism comprises a power gear installed on the first output shaft and rotating along with the first output shaft as well as a face gear engaged with the power gear, the rotation direction of the face gear is perpendicular to the rotation direction of the power gear;
the second-stage deceleration mechanism comprises a second-stage pinion rotating coaxially with the face gear, a middle gear set engaged with the second-stage pinion and driven to rotate by the second-stage pinion, a planetary gear set engaged with the middle gear set, a fixing gear engaged with the planetary gear set to prevent the planetary gear set from idling, the second-stage pinion and the planetary gear set each are locked on a fixing shaft on the power output mechanism.

9. The robot of claim 8, wherein the middle gear set comprises a first gear engaged with the second-stage pinion and driven to rotate by the second-stage pinion, a third-stage pinion rotating coaxially along with the first gear, a second gear engaged with the third-stage pinion and driven to rotate by the third-stage pinion, a third sun gear rotating coaxially along with the second gear and driving the planetary gear set to rotate.

10. The robot of claim 8, wherein the planetary gear set comprises three planetary gears disposed around the outside of the third sun gear and engaged with the third sun gear, a planet carrier installed on the fixing shaft corresponding to the planetary gear set for installing the planetary gears, the fixing gear is put around a periphery of the planetary gears and engaged with each of the planetary gears.

11. The robot of claim 10, wherein the power output mechanism further comprises an end cap fixedly connected to the second output shaft and the planet carrier, the end cap is located between the second output shaft and the planet carrier, the planet carrier comprises a lower clamp board fixedly connected with the end cap and a planetary shaft fixedly connected with each of the planetary gears, an installation opening for installing each of the planetary gears is formed between the end cap and the lower clamp board, the planetary shaft is disposed inside the installation opening, and one end of the planetary shaft is inserted into the end cap while the other end of the planetary shaft is inserted into the lower clamp board.

12. The robot of claim 8, further comprising a base seat provided with a first accommodation chamber, and a side cover fixedly connected with the base seat and forming a second accommodation chamber along with the base seat, the power input apparatus is installed inside the first accommodation chamber, the first-stage deceleration and the second-stage deceleration mechanism are installed inside the second accommodation chamber, the fixing gear is fixed on the base seat and the side cover.

13. The robot of claim 12, wherein the base seat comprises a body part provided with the first accommodation chamber, a support part protruding out of the bottom of the body part for supporting the face gear, the support part is provided with a fixing aperture, the fixing shaft corresponding to the second-stage pinion is inserted into the fixing aperture and passes through the face gear.

14. The robot of claim 13, wherein the base seat further comprises ring part opposite to the support part and disposed around a periphery of the fixing gear, and a fixed inner side located between the ring part and the support part and opposite to an end face of the side cover so as to fixedly connect to the end face of the side cover.

15. A servo, comprising:
a power input apparatus providing rotational power;
a deceleration apparatus driven to operate by the power input apparatus; and
a power output mechanism driven to rotate by the deceleration apparatus;
wherein the deceleration apparatus comprises a first-stage deceleration mechanism and a second-stage deceleration mechanism connected between the first-stage deceleration mechanism and the power output mechanism; the power output mechanism comprises an output shaft driven to rotate by the second-stage deceleration mechanism and is configured to connected with an exterior component, and an output bearing arranged around the output shaft, the second output shaft is an external spline output shaft;

the second-stage deceleration mechanism comprises a second-stage pinion rotating as driven by the first-stage deceleration mechanism, a middle gear set engaged with the second-stage pinion and driven to rotate by the second-stage pinion, a planetary gear set engaged with the middle gear set, a fixing gear engaged with the planetary gear set to prevent the planetary gear set from idling, the second-stage pinion and the planetary gear set each are locked on a fixing shaft on the power output mechanism.

16. The servo of claim 15, wherein the middle gear set comprises a first gear engaged with the second-stage pinion and driven to rotate by the second-stage pinion, a third-stage pinion rotating coaxially along with the first gear, a second gear engaged with the third-stage pinion and driven to rotate by the third-stage pinion, a third sun gear rotating coaxially along with the second gear and driving the planetary gear set to rotate.

* * * * *